United States Patent [19]
Jahn et al.

[11] Patent Number: 5,918,718
[45] Date of Patent: Jul. 6, 1999

[54] FRICTION UNIT FOR SYNCHRONIZATION DEVICE OF TRANSMISSION

[75] Inventors: Wolfgang Jahn; Paul Kränsel, both of Peiting, Germany

[73] Assignee: Hoerbiger Antriebstechnik GmbH, Schongau, Germany

[21] Appl. No.: 08/888,700

[22] Filed: Jul. 7, 1997

[30] Foreign Application Priority Data

Jul. 8, 1996 [AT] Austria ................................. 1199/96

[51] Int. Cl.$^6$ .......................... F16D 69/00; F16D 13/60
[52] U.S. Cl. .......................... 192/107 R; 192/66.2; 427/271
[58] Field of Search .................. 192/63.2, 66.21, 192/66.1, 53.1, 53.3, 53.32, 53.34, 70.15, 107 R; 29/527.2; 427/271, 355, 357; 428/66.2

[56] References Cited

U.S. PATENT DOCUMENTS

| | | |
|---|---|---|
| 191,314 | 5/1877 | Clark .................................. 192/70.15 |
| 686,960 | 11/1901 | Truitt .................................. 192/66.1 |
| 2,354,526 | 7/1944 | Lapsley et al. ................... 192/66.2 X |
| 3,871,944 | 3/1975 | Dominguez-Burguette ........... 428/66.2 |
| 4,267,912 | 5/1981 | Bauer et al. ........................ 192/53.34 |
| 4,770,283 | 9/1988 | Putz et al. ......................... 192/53.1 X |
| 5,143,192 | 9/1992 | Vojacek et al. .................... 29/527.2 X |

*Primary Examiner*—Rodney H. Bonck
*Attorney, Agent, or Firm*—Watson Cole Grindle Watson, P.L.L.C.

[57] ABSTRACT

The friction surfaces (4) of two essentially annular friction elements (1) which, through relative motion, can be arranged to transmit torque, are each approximately formed like the surface of a spherical layer whose center (M) is situated on the axis (5) of the annular frictional elements (1) outside the bottom plane of the spherical layer. This is a simple way to ensure a whole-surface, interlocking contact and a good friction performance over a large number of cycles even during a minor tilt of the two cooperating friction surfaces (4).

5 Claims, 1 Drawing Sheet

FRICTION UNIT FOR SYNCHRONIZATION DEVICE OF TRANSMISSION

BACKGROUND OF THE INVENTION

1. Field of the Invention

The invention relates to a friction unit, especially for synchronization devices of vehicle manual transmissions, which include two essentially annular friction elements, which, through relative motion, can be arranged to transmit torque through their contacting friction surfaces.

2. The Prior Art

Friction units of this kind are known and, for instance in couplings or brakes, or particularly in the aforementioned synchronization devices of gear boxes, enable a controlled friction-tight torque transmission. Thus, friction elements with essentially disk-shaped friction surfaces are known, but these present the drawback of a relatively high power requirement in order to press together the friction surfaces for the transmission of a specific torque. For this reason, especially in compactly built arrangements, frictional elements have become common in which the friction surfaces are conical, whereby, through appropriate selection of the cone angle, transmission of the required torque can be ensured even by means of a relatively minor coupling force.

In the case of the aforementioned manual transmissions, annular frictional elements are used as so-called synchronization rings for synchronization of the revolutions in the conical arrangement described. These frictional elements generally consist of a ring-shaped substrate or support made of brass or steel and a friction lining made of abrasive material, like for instance organic friction coatings or sintered friction coatings. During actual synchronization, the frictional element, having an interior and/or exterior friction surface, is pressed against one or two opposing conical surface(s), whereby the revolutions of the two gear shafts to be synchronized are brought into phase. With a manual transmission this is necessary during each shift from one gear to another.

Commensurate with the applicable state of the art, the designs of such frictional elements within the various manual transmissions differ very widely. However, with regard to their conical designs the friction surfaces show a commonality which, as mentioned, has proved advantageous due to space limitations in the gear boxes.

By analysis of a great number of friction units of the type mentioned that were inadequate with regard to a satisfactory synchronization effect, it was found that the required friction moments for adequate torque transmission often could no longer be attained after a relatively small number of shift or synchronization cycles, and up to now there has been no logical explanation for this.

SUMMARY OF THE INVENTION

Taking as a basis the known problems addressed above, the present invention starts out with the assumption that the conical design of the friction surfaces acting together suffers from the fundamental defect that, during the shifting process or the initiation of synchronization (which also holds true for couplings, brakes and the like), the friction cone itself, which is short because of a relatively narrow annular friction element, must be pushed onto the cone which is its counterpart, and it cannot be guided during that process. As such, a slight tilt of the two cones in relation to each other may occur. This results in the two friction surfaces not lining up surface to surface, so that relatively small, basically sickle-shaped friction surfaces will be stressed disproportionally or will even be overstressed. The consequence is increased wear at the overstressed parts. The synchronization device, or generally, the friction device, due to the poor contact pattern, does not attain the required friction moments and finally fails. As a result of the unequal contact, the contacting friction areas are finally thermally overstressed and damaged. With friction elements operating within oil having a high additive content, reactions occur at the thermally overstressed friction areas, which all told, goes along with an ever diminishing friction result.

Beginning with the stated problems or the above-mentioned considerations, the present invention provides a solution to the challenge of enabling an even, friction-tight contact of the actual friction surfaces, or to exclude an uneven contact. Its construction design and the manufacturing process should be appropriately easy to realize.

In accordance with the invention, the above-mentioned task involving a friction unit of the aforementioned type is accomplished by having the friction surfaces in each case shaped at least approximately like the surface of a spherical layer whose center is situated on the axis of the annular frictional element outside the bottom plane of the spherical layer (the bottom plane is defined, both here and in the following, as the imaginary plane defined by the end of the spherical layer at the side nearest to or coincident with the larger opening of the annular friction element). The cooperating friction surfaces therefore are always essentially shaped like parts of a spherical surface, as a very simple way to prevent any tilt during their engagement for friction-tight cooperation. This simple solution to the problems discussed above is all the more astonishing when the friction behavior results are examined. With immersed friction units, the friction moment achieved could, for instance, be kept constant from one oil to another, while the oil type had made a difference before, and over at least 10,000 cycles. The performance with regard to wear, which was gauged by the gradually occurring axial shift during cooperation of two partnered-up friction surfaces over a period of time, and which remained practically constant after 2,000 cycles, was even more astonishing.

It must be pointed out here that the above directions for the friction unit design or actual embodiment according to the invention must not be interpreted in a strict geometrical sense, because by its very nature, deviations within the scope of the usual tolerances or rather, tolerance pairings, can readily be tolerated. Besides, the friction pairs used these days always exhibit some elasticity, so that deviations from the strict geometrical relation mentioned for the spherical layer formation of the friction surfaces, within a certain scope, will have no influence on the friction performance of the friction unit. The point is that the friction surfaces operating together during the beginning of their friction-tight contact may be tilted considerably in relation to one another with regard to their shaft angles, but this still allows for practically whole-surface positive locking of the two friction surfaces. Only a minor portion of the friction surfaces, which then does not contact due to tilting, is lost for torque transmission, but this is at most a small percentile.

The mentioned geometrical relation shall further be thus understood that, with the embodiment of the friction unit in accordance with the invention, naturally the focus must always be on the friction system itself, that is, on the two friction surfaces actually working together, or their absolute size and angle alignment, because the primary task is to ensure that the desired torque may be transmitted under the given conditions. For this purpose an appropriate cone angle generally is determined, together with the diameter and width of the friction surfaces initially assumed to be conical. Afterward the center of the surface of the relevant spherical layer is placed in such a way that, in relation to this spherical layer, it lies outside of its bottom plane (usually the lateral border of the ring), or in any case just barely within this bottom plane, on the imaginary central axis of the friction elements, as this is the only way to ensure that the two cooperating friction surfaces can indeed be axially moved in relation to one another. If it should occur that, due to a disproportionate ring radius or diameter vis-a-vis the ring width and the cone angle, the center of this spherical layer comes to be within the ring width or spherical layer, then, by correcting the aforementioned condition, a correction can be made to ensure the geometrical relationship with regard of the position of the center of the spherical layer.

During experiments with synchronization devices of vehicle drives embodied according to the invention, friction moments with constant frictional values, a considerable oil independence and an only slight change (increase) in axial moveability over many thousand shift cycles resulted. No overstressed friction surface areas of the kind initially described in relation to drawbacks with the state of the art were found.

According to the invention, the process for manufacturing essentially annular friction elements, specifically for synchronization devices for vehicle manual transmissions, is characterized by first producing the friction surfaces as conical surfaces with a cone angle chosen for torque transmission, and in a subsequent calibration step at least approximately develop the friction surfaces as the surface of a spherical layer with its center on the axis of the annular friction elements outside the bottom plane of the spherical layer.

In accordance with advantageous embodiments of the process described, the calibration step may be carried out either by grinding the friction surface, or, in case of sintered friction coatings, by stamping with a stamping tool having the opposite surface of the surface of the spherical layer. In case of a friction ring with a powder metal sintered coating working together with a metallic opposite surface, the metallic friction surface can be ground accordingly and the sintered friction surface be stamped as described, and it is unimportant whether the basically conical shape is produced before calibration and before or after sintering of the frictional coating.

In the following, the invention is further explained through the example of the schematically drawn embodiment by means of the attached drawings.

DETAILED DESCRIPTION OF THE PREFERRED EMBODIMENT

Figure 1:
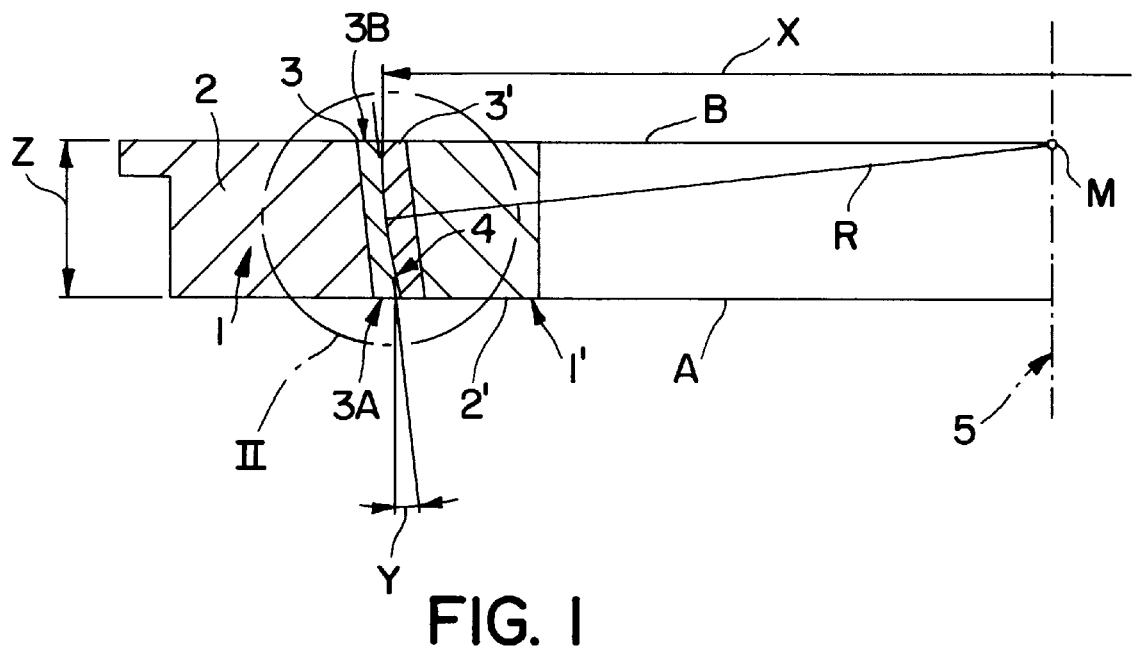
FIG. 1 shows a partial axial section through a friction element according to a preferred embodiment of the invention of a friction unit not fully depicted.

Referring to FIG. 1, the friction unit includes an outer annular friction element 1 and a cooperating inner annular friction element 1'. The outer annular friction element 1 includes a support ring 2, for instance made of steel or brass, which on its inner surface is provided with a powder metal sintered friction layer 3, and the inner annular friction element 1' includes a support ring 2', also made of, e.g., steel or brass, and a powder metal sintered friction layer 3' on an outer surface thereof. The actual friction surface of element 1 is found at the free inner surface of friction layer 3 and has a generally conical arrangement in relation to axis 5 of friction element 1, whereby one angle Y is chosen or calculated according to known and, in connection with such arrangements, routine calculation methods for torque transmission, taking into account the width Z and radius X of friction surface 4. The outer friction surface of friction layer 3' is similarly configured.

Friction surface 4 deviates from a pure cone surface, as exhibited by support 6 at the transition toward support ring 2, and is at least approximately shaped like the surface of a spherical layer whose center M here lies at the intersection of axis 5 of friction elements 1,1' with a radius, R, on the cone angle Y selected for torque transmission, of half of the width of the friction surface (Z/2). As can be seen from FIG. 1, the here present proportions of ring radius X to ring width Z to cone angle Y result in locating the spherical layer center point M further from the lower end 3A of the friction ring 3 than its upper end 3B and at the penetration point of axis 5 through the bottom plane B of the friction layer, which here coincides with the upper plane of the upper end of the illustrated friction element 1. It would also be possible to locate M above the upper plane of friction element 1, within the illustration according to FIG. 1. If M were to lie within the width Z of the friction element 1 or the friction surface 4 (between upper plane B and lower plane A of the friction layer), then the two cooperating friction elements 1 could no longer be axially moved relative to one another. In that case the proportion of X:Z:Y would have to be appropriately adapted or changed.

As seen in the figures, the cooperating friction element 1' includes an inner ring 2' which supports a friction layer 3' providing a similar opposing outer surface in relation to friction surface 4 which, during initiation of the friction-tight torque transmission, is pressed predominantly concentrically and in the direction of axis 5 relative to friction element 1, and may readily tilt vis-a-vis friction element 1, whereby nevertheless a large-surface, interlocking contact of the two cooperating friction surfaces 4 will occur.

Figure 2:
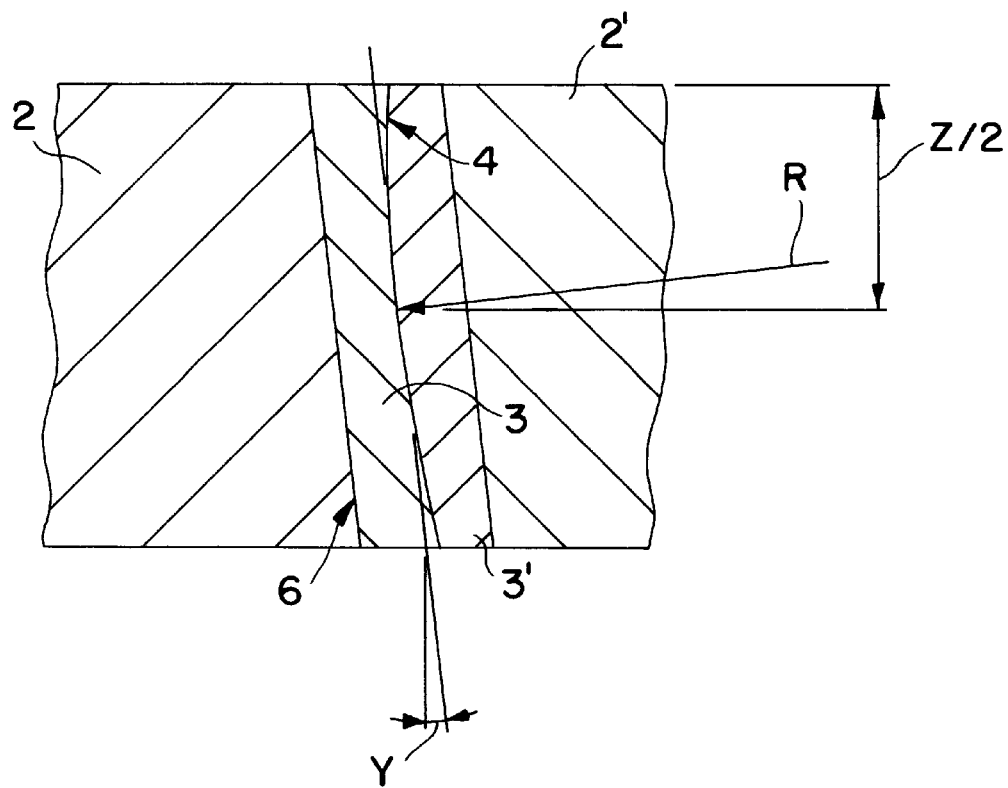
FIG. 2 shows an enlarged view of detail II in FIG. 1.

The friction moment in each case and in this embodiment (just as with the purely conical arrangement of the cooperating friction surfaces known up to now) also results from the ring diameter or ring radius X, the ring width Z and cone angle Y, which is easy to understand, considering that (as illustrated in FIG. 2), the actual "cone angle" in the upper region of the friction element is smaller, but conversely in the lower part oE the friction ring correspondingly larger than the cone angle Y ascribed tangentially in the center.

In a particular example of the embodiment a single cone ring 1 with a friction diameter of x=72 mm is sintered with a metallic friction coating and provided with a cone angle Y of 6.50°. At a ring height Z of 7.9 mm the design is realized in such a way that the radius of curvature of the friction surface is 36 mm. The opposite cone is given the same radius of curvature, which is produced by grinding. Both parts, the friction ring and the opposite cone, during this design solution and within a certain angle range, can operate in a friction-tight manner without tilting. Dynamic friction values of 0.11 to 0.12 resulted no matter whether mineral oil (such as SAE 75W-G14) or synthetic oil (such as EGL284) were used. After 10,000 cycles an axial deviation of 0.08 to 0.12 was determined.

In another example a double cone friction ring with a friction diameter of X=100 mm in the shape of a flat part was sintered with a friction coating and subsequently reshaped, for instance, according to Austrian Patent No. 385,826. The design of the friction ring was realized with a ring height Z of 9.8 mm and a radius of curvature R of 50.015 mm on the outside and 45.004 mm on the inside (with 2× the ring thickness subtracted). With this friction ring, the tangent angle Y was 7.

The insertion point M for the radius of curvature was established at the intersection of the tangent vertical and ring axis 5. The opposing cones on the outside and inside were provided with the same radius of curvature. The friction ring was tested for 10,000 cycles in wholly synthetic oil (such as BOT 72/94) and in mineral oil (such as SAE 74W-GL4). Both tests, independently from the specific axial force of 2 to 6 N/mm$^2$, yielded a friction value of 0.105 to 0.115 and an axial deviation of 0.1 mm. The axial deviation occurred within the first 2,000 cycles and after that, no change could be determined. The friction ring showed an even contact pattern, inside and outside.

We claim:

1. A friction element of a friction unit which comprises:

a support ring that defines an imaginary central axis and which provides a conical inner surface that decreases in radius relative to said central axis from a first end of said support ring to a second end, and a friction layer on said conical inner surface, said friction layer having a first end coincident with said first end of said support ring which defines an imaginary bottom plane extending through said central axis and a second end coincident with said second end of said support ring which defines an imaginary top plane extending through said central axis, said friction layer forming a generally spherical inner surface whose radius extends from a point on said imaginary central axis that is further from said second end of said support ring than said first end and no closer to said top plane than a point where said bottom plane meets said central axis.

2. A friction unit which comprises a first, outer annular friction element having an inner friction layer and a second, inner annular friction element having an outer friction layer, said first and second annular friction elements being relatively movable along a common axis to be engagable such that said inner and outer friction layers abut one another along respective friction surfaces thereof, each of said first and second friction elements having opposite first and second axial ends which, when said first and second friction elements are engaged, respectively define first and second imaginary planes that extend through said common axis, said friction surfaces of said first and second friction elements conforming to a surface of an imaginary sphere whose center is located on said common axis no closer to said second imaginary plane than where said first imaginary plane crosses said common axis.

3. A process for manufacturing a substantially annular friction element which comprises: providing an annular support ring defining an inner surface, and outer surface and opposite first and second ends that define imaginary first and second planes extending through an axis of said support ring, depositing a friction layer on one of said inner and outer surfaces of said support ring so that said friction layer provides a substantially frustoconical exposed friction surface, and shaping said substantially frustoconical friction surface so as to substantially conform to a surface of an imaginary sphere whose center is located on said axis no closer to said second plane than a point where said first plane crosses said axis.

4. Process in accordance with claim 3, wherein said shaping comprises grinding of the friction surface.

5. Process in accordance with claim 3, wherein said shaping comprises stamping the friction surface with a stamping tool having an opposite surface in relation to the spherical friction surface of the friction layer.

* * * * *